US006871556B2

(12) United States Patent
Andresen et al.

(10) Patent No.: US 6,871,556 B2
(45) Date of Patent: Mar. 29, 2005

(54) POROUS PROTECTIVE SOLID PHASE MICRO-EXTRACTOR SHEATH

(75) Inventors: Brian D. Andresen, Livermore, CA (US); Erik Randich, Manteca, CA (US)

(73) Assignee: The Regents of the University of California, Oakland, CA (US)

( * ) Notice: Subject to any disclaimer, the term of this patent is extended or adjusted under 35 U.S.C. 154(b) by 65 days.

(21) Appl. No.: 09/917,475

(22) Filed: Jul. 27, 2001

(65) Prior Publication Data

US 2003/0021733 A1 Jan. 30, 2003

(51) Int. Cl.[7] .................................................. G01N 1/10

(52) U.S. Cl. ................ 73/863.21; 73/64.56; 73/864.01; 73/864.71; 422/69; 422/88; 422/101

(58) Field of Search ......................... 73/863.21, 863.23, 73/864.71, 864.72, 54.42, 61.43, 61.59, 61.76, 64.56, 863.71, 335.11, 335.13, 864, 864.51, 864.74, 864.16, 864.21, 864.87; 436/178; 422/58, 69, 99, 100, 101; 604/164, 11–15, 190; 356/417; 385/12

(56) References Cited

U.S. PATENT DOCUMENTS

| | | | | |
|---|---|---|---|---|
| 3,959,183 A | * 5/1976 | Gospodar | ................... | 502/319 |
| 4,341,635 A | 7/1982 | Golias | ....................... | 210/656 |
| 4,732,046 A | * 3/1988 | Lawrence et al. | ....... | 73/864.21 |
| 5,432,098 A | * 7/1995 | Wilks | ......................... | 436/178 |
| 5,565,622 A | * 10/1996 | Murphy | ..................... | 73/61.55 |
| 5,691,206 A | 11/1997 | Pawliszyn | ................... | 436/178 |
| 5,693,228 A | * 12/1997 | Koehler et al. | ............. | 210/656 |
| 5,938,939 A | * 8/1999 | Vial et al. | .................... | 210/767 |
| 6,039,923 A | * 3/2000 | Klemm et al. | ................ | 422/61 |
| 6,042,787 A | * 3/2000 | Pawliszyn | .................... | 422/69 |
| 6,164,144 A | * 12/2000 | Berg | ....................... | 73/863.21 |
| 6,354,135 B1 | * 3/2002 | McGee et al. | ............. | 73/23.34 |
| 6,397,658 B1 | * 6/2002 | Villettaz et al. | ........... | 73/19.12 |
| 6,477,907 B1 | * 11/2002 | Chambers et al. | ............ | 73/866 |
| 6,481,301 B2 | * 11/2002 | Pawliszyn | ................ | 73/864.71 |
| 6,495,375 B2 | * 12/2002 | Ledig | ......................... | 436/181 |
| 2002/0034827 A1 | * 3/2002 | Singh et al. | ................ | 436/177 |

FOREIGN PATENT DOCUMENTS

GB 2158265 A * 11/1985 .......... G01N/21/09

OTHER PUBLICATIONS

Zhang et al., "Direct Solid Phase Microextraction of Complex Aqueous Samples With Hollow Fibre Membrane Protection", Jul. 1996, Royal Society of Chemistry, Analytical Communications vol. 33, No. 7, pp 219–221.*

* cited by examiner

*Primary Examiner*—Hezron Williams
*Assistant Examiner*—David A. Rogers
(74) *Attorney, Agent, or Firm*—James S. Tak; Alan H. Thompson; Eddie E. Scott

(57) ABSTRACT

A porous protective sheath for active extraction media used in solid phase microextraction (SPME). The sheath permits exposure of the media to the environment without the necessity of extending a fragile coated fiber from a protective tube or needle. Subsequently, the sheath can pierce and seal with GC-MS septums, allowing direct injection of samples into inlet ports of analytical equipment. Use of the porous protective sheath, within which the active extraction media is contained, mitigates the problems of: 1) fiber breakage while the fiber is extended during sampling, 2) active media coating loss caused by physical contact of the bare fiber with the sampling environment; and 3) coating slough-off during fiber extension and retraction operations caused by rubbing action between the fiber and protective needle or tube.

12 Claims, 2 Drawing Sheets

POROUS PROTECTIVE SOLID PHASE MICRO-EXTRACTOR SHEATH

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to a device for solid phase microextraction and analysis, particular to a sheath which resolves problems associated with the fragile fiber coated with the active extraction media for solid phase microextraction devices, and more particularly to a porous protective sheath which contains the active extraction media used in solid phase microextraction.

Solid phase micro-extraction (SPME) is a chemical sampling technique which adsorbs/absorbs the analyte from the sample without the use of solvents or the need for exhaustive extractions. The active portion of the SPME device usually consists of a small diameter (50–300 $\mu$m) fused silica fiber coated with 10–200 $\mu$m of an active absorbent or media. The absorbing material can be a wide variety of organic or inorganic materials. Some examples of commercially available media include polydimethyl siloxane, bonded divinylbenzene/styrene spheres, activated carbon spheres, etc. The coated fiber is housed in the needle of a GC-MS syringe, and can be mechanically extended and thus exposed to both collect analytes from the environment or sample fluid and desorb analytes into the GC injection pod. The fiber is retracted into the needle when not in use.

In the past, the SPME technique has several major drawbacks including: fiber breakage due to mechanical stress, unintentional physical contact, and or vibration; 2) gross media coating loss from the fiber due to accidental physical contact of the exposed coated fiber; and minor coating loss due to general decohesion of the bonded particulate coatings when exposed to the environment.

FIG. 1 illustrates the SPME process and shows the operation of a typical fiber/syringe assembly, such as exemplified by U.S. Pat. No. 5,691,206 issued Nov. 25, 1997 to J. B. Pawlisyn. The coated SPME fiber (hereafter referred to as fiber) is stored fully retracted inside the syringe needle. To clean (activate), expose, and desorb the fiber, the plunger is depressed and the fiber is extended out of the needle. After exposure, the plunger is released and a spring-operated mechanism retracts the fiber into the needle to protect it. The fiber remains in the needle during the septum piercing operation when the sample is injected into the GC or HPLC port. The fiber is then extended into the inlet port to desorb the sample into the GC or HPLC.

It is apparent that the exposure of the extended, unprotected fiber causes a high risk of mechanical breakage of the fiber or coated media loss, particularly when the fiber is used for general environmental air or $H_2O$ sampling such as a smokestack, lake, waste oil, etc., which is not done under laboratory conditions. In addition, the sliding action of the fiber in the needle as well as its unprotected exposure to the environment can easily cause a gross or minor amount of coating loss. Both fiber breakage and loss of coating can often go unnoticed, which will cause either a change in performance of the fiber or complete failure of the fiber. The user can thus unknowingly collect erroneous data.

The present invention minimizes the above-referenced problems by the use of a porous protective sheath which prevents fiber breakage and minimizes media loss. The porous protective sheath contains the active extraction medium therein and replaces the coated fiber. Use of this sheath eliminates the need for complete unprotected exposure of the fiber. Basically, porosity of the sheath is provided a number of openings or slots via which the active media contained within the sheath is exposed to the selected environment, sample, etc. The sheath is of sufficient strength for the septum piercing operation, and may have an open or pointed end. The porous sheath may be mounted so as to retract into the needle of the device of above referenced U.S. Pat. No. 5,691,206 in place of the fiber, or replace the needle and the fiber of that device, but would be subjected to exposure of the environment unless the pores, openings or slots thereof were covered.

SUMMARY OF THE INVENTION

It is an object of the present invention to provide a solution to the problems associated with the coated retractable fiber of typical SPME devices.

A further object of the invention is to provide a porous protective SPME sheath.

Another object of the invention is to provide an SPME device with a porous protective sheath in place of the typical coated fiber.

Another object of the invention is to provide a porous protective SPME sheath which contains the active extraction media.

Other objects and advantages of the present invention will become apparent from the following description and accompanying drawings. The present invention involves an SPME apparatus having a porous protective sleeve containing active extraction medium for carrying out the SPME process in place of the fiber coated with the active extraction medium, as typically used in prior SPME apparatus. Use of the porous, media containing, protective sheath mitigates the problems of: 1) fiber breakage, 2) active media coating loss by contact, and 3) coating slough-off due to rubbing. The porous sheath may be of an open end or closed end type, with pores, openings, or slots formed in selected sections along the length of the sheath, or in the overall length of the sheath. The sheath is constructed so as to form a seal with the septums through which the sheath is inserted. The porous sheath provides protection of the active media located therein while enabling access to or exposure of the active media by the environment, sample material, etc.

BRIEF DESCRIPTION OF THE DRAWINGS

The accompanying drawings, which are incorporated into and form a part of the disclosure, illustrate embodiments of the invention and, together with the description, serve to explain the principals of the invention.

DETAILED DESCRIPTION OF THE INVENTION

The present invention involves a porous protective sheath for active extraction media used in solid-phase microextraction (SPME). The sheath replaces the coated fiber of the typical SPME apparatus, and retains the active extraction media therein, but which has exposure to selected environment, samples, etc. via to pores (openings or slots) of the sheath. The porous protective sheath mitigates the above-described problems associated with the fragile coated fiber of the prior SPME devices. The sheath can be readily mounted in an SPME syringe assembly in place of the coated fiber, such as in the syringe of the above-referenced U.S. Pat. No. 5,691,206 wherein the sheath would be movably mounted in the needle of that syringe. The sheath is of sufficient strength to enable septum piercing, and may have a pointed or open end.

Figure 1:
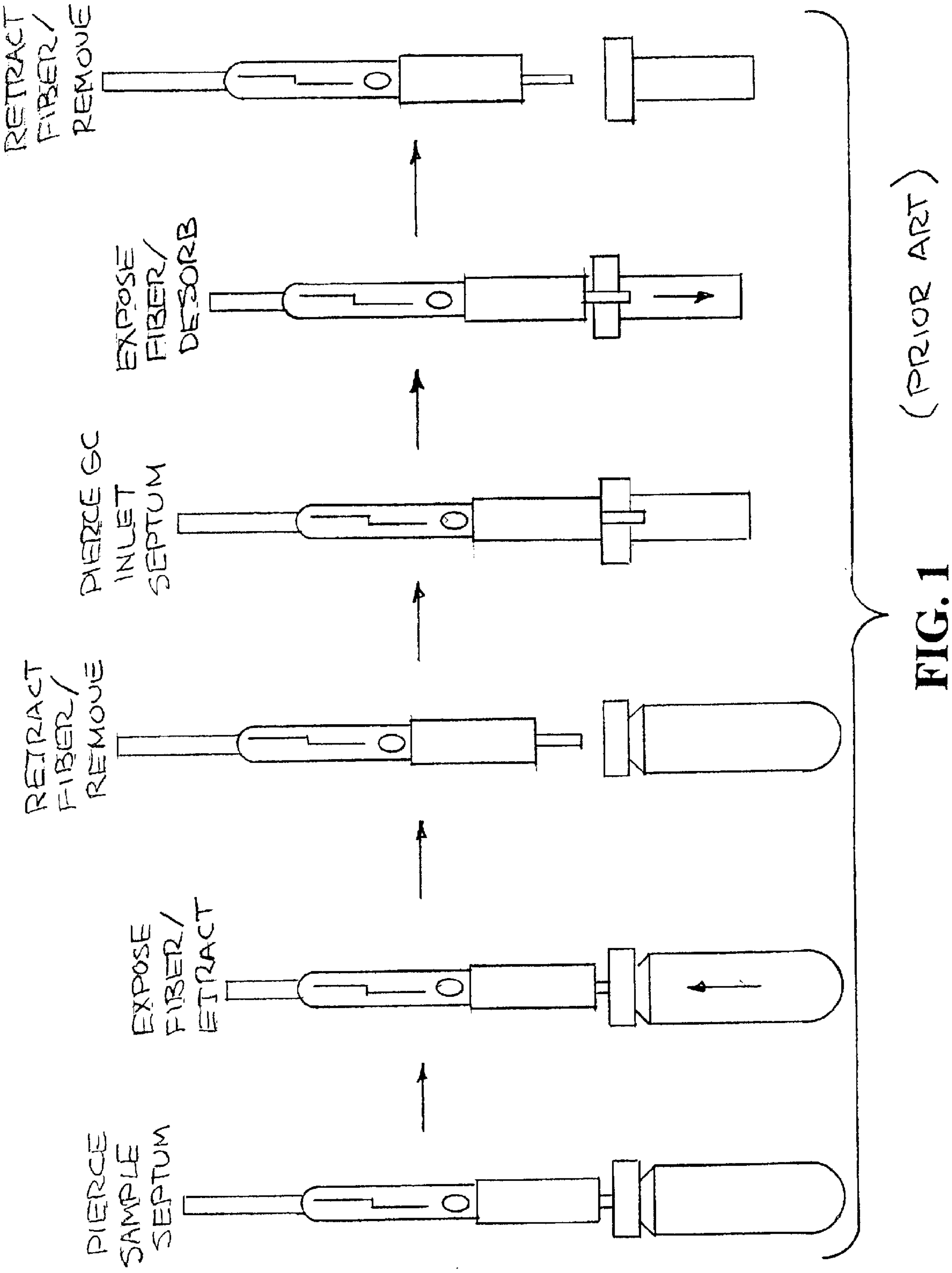
FIG. 1 illustrates the prior art SPME process.
Figure 2:
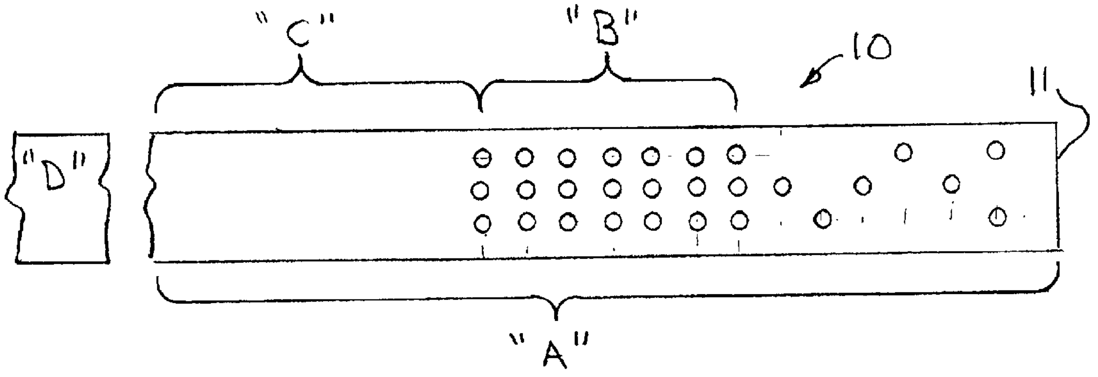
FIGS. 2–4 illustrate different embodiments of the porous protective SPME sheath, each made in accordance with the present invention.
Figure 3:
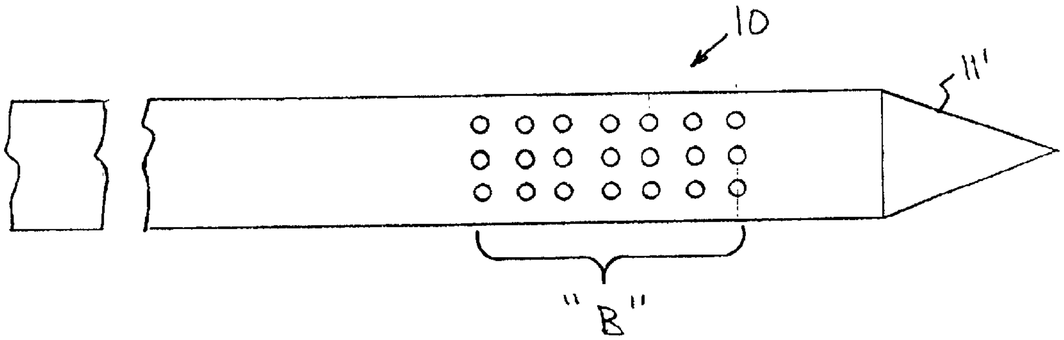
Figure 4:
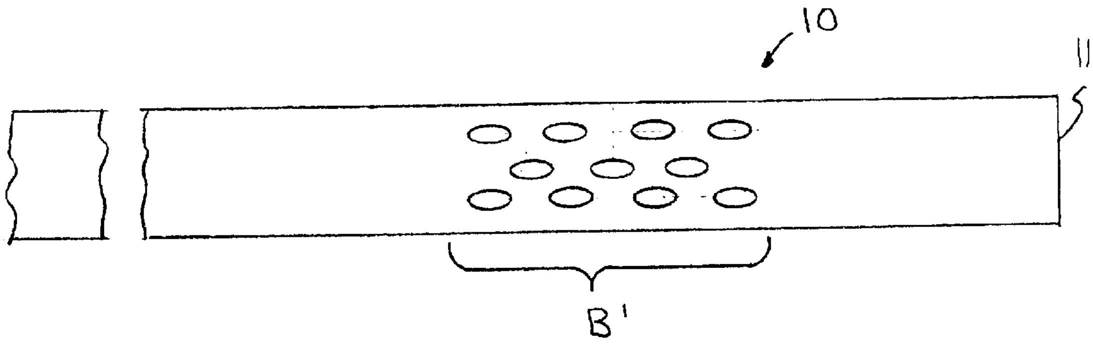

FIGS. 2–4 illustrate embodiments of the porous protective sheath, with the embodiment of FIG. 3 having a pointed end and the embodiment of FIG. 4 having slots instead of circular openings in the side wall of the sheath. The openings or slots in the sheath may extend to the end as shown in FIG. 2. As seen in FIG. 2, the porous sheath generally indicated at 10 consists of a tube or needle "A" having a series of pores, perforations, or openings "B" along a specified length. The openings "B" may be located at any desired section along the length of the "A". This configuration allows the sheathed assembly to be inserted through a septum into the injection port of a GC/MS, etc. The sample is desorbed at section "B" while section "C" maintains a gas-tight seal with the septum. A gas-tight seal at "D" can be used for permanently mounted sheaths or a standard GC injection assembly syringe can be used to seal the sheath end. The perforated section "B" can be located anywhere along the sheath length, depending upon its intended use, or for certain application it can extend the entire length of the tube "A". As shown in FIG. 3, the top 11$^1$ of the tube A is closed and pointed, while the tip 11 of FIG. 2 is flat and may be open or closed. The perforations or opening "B" can be of a wide variety of sizes or shapes to suit the intended use, and are shown at $B^1$ in FIG. 3 as slots. Also, the slots of FIG. 4, for example, may be changed to slits of various lengths and widths.

A typical porous sheath and its fabrication are outlined below. The sheath consists of a tube of about 200 μm to 2.0 mm O.D. and 100 μm to 1.5 mm I.D. with a length of 0.5 cm to 5 cm. The tube can be composed of any of a variety of materials including metals, polymers, ceramics, and glasses. A preferred material is a metal or alloys of the metals, including but not limited to stainless steel, Ta, Ni, Pt, Au, Al, W, Mo, and Ti. Such materials are flexible but still protective in nature. The perforations in the tube may be accomplished mechanical, chemical, chemo-mechanical, or laser machining or drilling. Size, shape, number, and locations of the perforations depend on the application. Typically, holes or slots with characteristic dimensions of about 5–200 μm can be laser drilled or trepanned as required. The length of section "B" ranges from about 0.1 cm to 2.0 cm for a normal GC-MS syringe needle. For a longer tube (5 cm to 10 cm) section "B" can be the whole length of the tube. After the perforation operation, the sheath is chemically etched, electropolished or mechanically polished to remove burrs, spatter, etc., and to smooth the OD surface. This allows easy insertion of the tube into a septum and subsequent sealing.

The embodiments of FIGS. 2–4 are merely representative of the many embodiments for use with the SPME process. The protective sheath can also be used with a standard media coated silica SPME fiber, wherein the fiber is located with the sheath, or the sheath can be filled with the desired absorbent resin material in loose or cold pressed form. If the media is of a loose composition, the perforations would be sized smaller than the resin particles so that the particles would remain entrapped in the sheath.

It has thus been shown that the present invention provides a solution to the problems associated with the coated fibers of SPME devices. The porous protective sheath contains therein the active extraction media while permitting exposure of the media to the environment, sample fluid, etc. The porous sheath may be mounted to the retractable needle so as to cover the perforations during non-use, but is of sufficient structure to enable septum piercing without the assistance of a support tube or needle as in the current coated fiber devices. Applications for the invention include weapons stockpile stewardship, CW detection, forensic analysis, and environmental sampling (PCB detection, etc.).

While specific embodiments of the invention have been described and illustrated, along with materials, parameters, etc. to exemplify and teach the principles of the invention, such are not intended to be limiting. Modifications and changes may become apparent to those skilled in the art, and it is intended that the invention be limited only by the scope of the appended claims.

What is claimed is:

1. A porous protective sheath for solid phase micro-extraction, comprising:

a porous tube adapted to pierce a septum, said porous tube having an end section selected from the group consisting of a closed section and an open end section, said porous tube being provided with at least a section along a length thereof having perforations, said porous tube having an active extraction media contained therein to protect the active extraction media from exposure outside the sheath and possible damage thereby, and wherein the perforations enable the active extraction media to carry out solid phase micro-extraction from within the porous tube, and wherein said active extraction media has a loose particulate composition, and said perforations and the open end of said open end section are sized smaller than the active extraction media to keep the active extraction media entrapped within the sheath.

2. The sheath of claim 1, wherein said perforations are located along a substantial length of said tube.

3. The sheath of claim 1, wherein said end section has a configuration selected from the group consisting of flat and pointed end sections.

4. The sheath of claim 1, wherein said perforations have a configuration selected from the groups consisting of circular and non-circular.

5. The sheath of claim 1, wherein said tube is constructed from materials selected from the group consisting of metals and metal alloys.

6. The sheath of claim 1, where said tube additionally includes a section configured top form a seal with an object through which said tube extends.

7. The sheath of claim 1, wherein said tube is constructed of material having a strength sufficient to carry out a septum piercing operation without damage to said tube.

8. In a device for solid phase micro-extraction, the improvement comprising:

a porous sheath adapted to pierce a septum, said porous sheath having active extraction media contained therein to protect the active extraction media from exposure outside the sheath and possible damage thereby, and having perforations along at least a section of length thereof which enable the active extraction media to carry out a solid phase micro-extraction process from within the sheath, wherein said active extraction media has a loose particulate composition and said perforations are sized smaller than the active extraction media to keep the active extraction media entrapped within the sheath.

9. The improvement of claim 8, wherein said perforations are located along substantially an entire length of said tube.

10. The improvement of claim 8, wherein said tube includes an end section selected from the group consisting of a flat end section and a pointed end section.

11. The improvement of claim 8, wherein said perforations have a configuration, selected from the group consisting of circular and elongated.

12. The improvement of claim 8, wherein said tube includes a section configured to form a seal when said tube is inserted through a septum.

* * * * *